United States Patent
Viger et al.

(10) Patent No.: US 11,778,664 B2
(45) Date of Patent: *Oct. 3, 2023

(54) ENHANCED CHANNEL ALLOCATION OVER MULTI-CHANNEL WIRELESS NETWORKS

(71) Applicant: CANON KABUSHIKI KAISHA, Tokyo (JP)

(72) Inventors: Pascal Viger, Janze (FR); Romain Guignard, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/383,016

(22) Filed: Jul. 22, 2021

(65) Prior Publication Data

US 2021/0352726 A1 Nov. 11, 2021

Related U.S. Application Data

(63) Continuation of application No. 15/558,140, filed as application No. PCT/EP2016/055850 on Mar. 17, 2016, now Pat. No. 11,089,627.

(30) Foreign Application Priority Data

Mar. 17, 2015 (GB) ..................................... 1504485

(51) Int. Cl.
*H04W 74/08* (2009.01)
*H04W 74/02* (2009.01)
(Continued)

(52) U.S. Cl.
CPC ... *H04W 74/0816* (2013.01); *H04W 72/0446* (2013.01); *H04W 72/0453* (2013.01);
(Continued)

(58) Field of Classification Search
CPC ............. H04L 12/2861; H04L 1/0048; H04W 72/0453; H04W 74/02; H04W 74/0816; H04W 72/0446
See application file for complete search history.

(56) References Cited

U.S. PATENT DOCUMENTS

| | | | |
|---|---|---|---|
| 2013/0229996 A1* | 9/2013 | Wang | H04L 1/0025 370/329 |
| 2017/0013645 A1* | 1/2017 | Choi | H04W 52/143 |
| 2017/0127451 A1* | 5/2017 | Chun | H04W 72/0446 |

* cited by examiner

*Primary Examiner* — Omer S Mian
(74) *Attorney, Agent, or Firm* — Canon U.S.A., Inc. IP Division

(57) ABSTRACT

The invention relates to a method and system for simultaneous transmission of data from two or more wireless communication device during a transmission opportunity otherwise reserved for a single communication device. The invention proposes collaboration among the group of communication devices to reserve a transmission opportunity on a composite channel comprising of a plurality of sub-channels for the entire group and to efficiently manage allocation of the sub-channels for simultaneous data transmission from two or more devices. In the main aspect of the invention, the collaboration takes the form of grouping the sub-channels in the reserved composite channel so as to allow two or more stations to transmit data simultaneously over a contiguous frequency band. The collaboration among the group of communication devices may be in a managed or an ad hoc mode. The invention is particularly relevant to the IEEE 802.11 ac communication standard.

16 Claims, 12 Drawing Sheets

(51) Int. Cl.
*H04W 72/0453* (2023.01)
*H04W 74/04* (2009.01)
*H04W 72/0446* (2023.01)

(52) U.S. Cl.
CPC ........... *H04W 74/02* (2013.01); *H04W 74/04* (2013.01); *H04W 74/0808* (2013.01)

| Group ID | bandwidth | Sub-channels | MAC @ of stations |
|---|---|---|---|
| 9 | 80MHz | 1st. 40 | MAC1 |
|   |       | 2nd. 40 | MAC2 |
| 10 | 80MHz | 1st. 40 | MAC1 |
|    |       | 2nd. 40 | MAC2, MAC3 |
| 11 | 80MHz | 1st. 40 | MAC1, MAC2 |
|    |       | 2nd. 40 | MAC3 |
| 12 | 80MHz | 1st. 60 | MAC1, MAC2 |
|    |       | 2nd. 20 | MAC3 |

Fig. 12

ENHANCED CHANNEL ALLOCATION OVER MULTI-CHANNEL WIRELESS NETWORKS

CROSS-REFERENCE TO RELATED APPLICATIONS

The present application is a continuation of U.S. patent application Ser. No. 15/558,140, filed on Sep. 13, 2017, that is a National Phase Application of PCT/EP2016/055850, filed on Mar. 17, 2016 from Great Britain Application No. 1504485.2 filed Mar. 17, 2015, which are hereby incorporated by reference herein in their entireties.

FIELD OF THE INVENTION

The present invention relates generally to communication networks and more specifically to methods and devices for data communication over a communication network using Carrier Sense Multiple Access with Collision Avoidance (CSMA/CA), the network being accessible by a plurality of stations.

BACKGROUND OF THE INVENTION

Wireless local area networks (WLANs), such as a wireless medium in a communication network using Carrier Sense Multiple Access with Collision Avoidance (CSMA/CA), are founded on the principles of collision avoidance. Such networks may also conform to a communication standard such as a communication protocol of 802.11 type e.g. Medium Access Control (MAC).

The IEEE 802.11 MAC standard defines the way WLANs must work at the physical and medium access control (MAC) level. Typically, the 802.11 MAC (Medium Access Control) implements the well-known Distributed Coordination Function (DCF) which relies on a contention-based mechanism based on the so-called "Carrier Sense Multiple Access with Collision Avoidance" (CSMA/CA) technique.

The 802.11 medium access protocol standard is mainly directed to the management of communication nodes waiting for the medium to become idle so as to try to access to the medium.

According to the IEEE 802.1ac standard provides very high throughput (VHT) by among other means moving from the 2.4 GHz band which is deemed to be highly susceptible to interference to the 5 GHz band, thereby allowing for wider channels of 80 MHz two of which may be combined to get a 160 MHz channel. The 802.11ac standard also tweaks the Request To Send (RTS) and Clear To Send (CTS) frames to allow for composite channels of varying bandwidths of 20, 40 or 80 MHz, the composite channels comprising of one or more contiguous. The possibility of a 160 MHz composite channel is possible by the combination of two 80 MHz. A composite channel therefore consists of a primary channel and at least a secondary channel of for example 20 MHz each. Tertiary and quaternary channels may also form part of the composite channel.

A station is allowed to use as much channel capacity (or bandwidth, i.e. of channels in the composite channel) as is available. The constraint is that the combined channels need to be contiguous for a station with a single antenna station (or single spatial stream). However, if there is noise or interference on one of the 20 MHz channel within the wider composite channel, the available bandwidth is reduced. The 802.11ac standard allows for only contiguous channels of 20, 40, 80 MHz bandwidth for single antenna devices. Therefore, noise or interference on even a small portion of the composite channel may reduce the available bandwidth of the composite channel to only 40 or 20 MHz.

There is therefore a need to efficiently allocate the channels so that at least one second station may utilize the otherwise wasted bandwidth not affected by noise or interference and not utilized by the first station.

Published patent U.S. Pat. No. 8,737,405 [LIU et al] discloses a "method and apparatus for determining channel bandwidth" during the 802.11 standardization process. According to this method, in point to point communication between two devices (one as a source, the second as destination), wherein the final communication negotiated through a multiple RTS/CTS handshake is narrowed to the contiguous channels including the primary 20 MHz channel. In addition, the resulting bandwidth is determined according bandwidth indication inside the RTS/CTS control frame.

US patent application published as US2013/0051256 A1 [ONG et al] similarly discloses known methods by which two or more stations contend for TXOP on a composite channel. Similar to U.S. Pat. No. 8,737,405, this document also discloses a method of enhanced channel utilization by allocating unused sub-channels of a composite channel for peer-to-peer communication between other stations belonging to the same basic service set (BSS).

Published patent U.S. Pat. No. 8,654,753 discloses a "multichannel TDMA mechanism" and deals with allocation of a plurality of channels to one or more destination nodes. This feature is related to MIMO transmissions, wherein a complex station (an access point AP) having several antennae can concurrently transmit data over several channels. A negotiation of available channels is performed with the destination channels, which indicates via a CTS control frame to the AP that the AP is free to transmit data across the allocated channel. Although the AP finally does not suffer from contiguous/non-contiguous channel issue, as such AP do not address the issue of wasted bandwidth in a TXOP of 802.11ac-compliant stations having only one antenna.

SUMMARY OF INVENTION

It is a broad objective of the proposed present invention to provide a communication methods and devices for data communication over an ad-hoc wireless network, the physical medium of which being shared between a plurality of communication stations containing at least one single antenna device.

According to the first aspect of the invention, there is provided a method for transmitting data between a plurality of wireless communication stations belonging to a collaborative group in a wireless communication network, the method comprising reserving a transmission opportunity (TXOP) that includes:
  sending from a first station belonging to the collaborative group a request control frame (RTS) for initiating a transmission opportunity (TXOP) reservation for the collaborative group on a first composite channel comprising a plurality of first sub-channels;
  receiving at the first station in response to the request control frame at least one response control frame (CTS) via a second composite channel comprising two or more of the plurality of first sub-channels, the response control frame (CTS) reserving a transmission opportunity (TXOP) for the collaborative group on the second composite channel;

the method further comprising:
obtaining at least two non-overlapping subsets; each subset comprising one or more sub-channels belonging to the second composite channel, and
simultaneously transmitting data within the reserved transmission opportunity (TXOP) from at least two stations belonging to the collaborative group, wherein each of the at least two stations transmits on a respective one of the obtained at least two subsets.

By requesting a reservation of a transmission opportunity for more than one station within the collaborative group, the first station can seek to utilize the reserved resources more efficiently. The second composite channel comprising a plurality of sub-channels may be partitioned in the frequency domain into two or more subsets of the composite channel, such that each subset may be used for simultaneous transmission of data from a respective station. This is advantageous over the prior art as it avoid stations other than the first station to repeat the RTS/CTS sequence as they can transmit data within the reserved transmission opportunity. Further, once the transmission opportunity is reserved, the method allows for frequency division of the reserved resource for two or more stations to transmit simultaneously.

According to another aspect of the invention, there is provided a method for transmitting data between a plurality of wireless stations belonging to a collaborative group in a wireless communication network, the method comprising reserving a transmission opportunity (TXOP) that includes:
receiving at a first station of the plurality of wireless communication stations a request control frame (RTS) for initiating a transmission opportunity (TXOP) reservation for the collaborative group on a first composite channel comprising a plurality of first sub-channels;
sending from the first station in response to the request control frame at least one response control frame (CTS) via a second composite channel comprising two or more of the plurality of first sub-channels, the response control frame (CTS) reserving a transmission opportunity (TXOP) for the collaborative group on the second composite channel;
the method further comprising:
obtaining at least two non-overlapping subsets; each subset comprising one or more sub-channels belonging to the second composite channel, and
simultaneously transmitting data within the reserved transmission opportunity (TXOP) from at least two stations belonging to the collaborative group, wherein each of the at least two stations transmits on a respective one of the obtained at least two subsets.

By reserving a transmission opportunity for more than one station within the collaborative group, the reserved resources can be more efficiently utilized. The second composite channel comprising a plurality of sub-channels may be partitioned in the frequency domain into two or more subsets of the composite channel, such that each subset may be used for simultaneous transmission of data from a respective station. This is advantageous over the prior art as it avoid the need for the first station to process the RTS/CTS for each of the transmitting stations transmitting data within the reserved transmission opportunity. Further, once the transmission opportunity is reserved, the method allows for frequency division of the reserved resource for two or more stations to transmit simultaneously.

Preferably the step of obtaining at least two subsets comprises determining based on a predetermined identifier (Group ID) a configuration of channel allocation among the second composite channel. This ensures that the collaborative group can pre-determine various permutations of channel allocation that may be used for efficiently using the reserved resources.

Preferably, the predetermined identifier (Group ID) is contained in the request control frame (RTS) for initiating the transmission opportunity (TXOP) reservation.

Preferably, the method further comprising a further step before the step of obtaining at least two non-overlapping subsets, the further step comprising determining based on a further identifier if a collaborative mode for simultaneous transmission from at least two stations within the transmission opportunity is requested.

Preferably, a request control frame (RTS) is sent for each of the plurality of first sub-channels.

Preferably, the method further comprises determining a request control frame (RTS) to be sent on one of the first sub-channels for initiating the transmission opportunity (TXOP) reservation; and
duplicating the request control frame (RTS) on each of the remaining first sub-channels of the first composite channel.

Preferably, the response control frame (CTS) is received for each of the sub-channels in second composite channel.

Preferably, the method further comprises determining a response control frame (CTS) to be sent on one of the sub-channels belonging to the second composite channel for reserving the transmission opportunity (TXOP) and duplicating the response control frame (CTS) on each of the remaining sub-channels of the second composite channel.

Preferably, the step of obtaining the non-overlapping sub-sets comprises identifying a contiguity break in the sub-channels in the second composite channel by detecting a lack of received response control frame (CTS) on a sub-channel of the first composite channel.

Preferably, one of the at least two subsets of the second composite channel is used by two or more stations belonging to the collaborative group within the transmission opportunity (TXOP).

Preferably the sub-channels contained in each subset are contiguous.

Preferably, the two subsets are not contiguous within the operating band.

Preferably, the wireless network is operating according to 802.11ac that defines a restricted number of predefined sub-channel subsets that are available for reservation by any wireless node of the wireless network to transmit data, and the second composite channel is different from any predefined sub-channel subset.

Preferably, one of the obtained at least two subsets is one of the predefined sub-channel subsets.

According to another aspect of the invention, there is provided an executable computer program, comprising a sequence of instructions for implementing the above method.

According to another aspect of the invention, there is provided a computer readable storage medium storing instructions of a computer program for implementing the above method.

According to another aspect of the invention, there is provided a system for transmitting data between a plurality of wireless communication stations belonging to a collaborative group in a wireless communication network,
the system comprising means for reserving a transmission opportunity (TXOP) that includes:
means for sending from a first station belonging to the collaborative group a request control frame (RTS) for initiating a transmission opportunity (TXOP) reservation for the collaborative group on a first composite channel comprising a plurality of first sub-channels;

means for receiving at the first station in response to the request control frame at least one response control frame (CTS) via a second composite channel comprising two or more of the plurality of first sub-channels, the response control frame (CTS) reserving a transmission opportunity (TXOP) for the collaborative group on the second composite channel;

the system further comprising:

means for obtaining at least two non-overlapping subsets; each subset comprising one or more sub-channels belonging to the second composite channel, and means for simultaneously transmitting data within the reserved transmission opportunity (TXOP) from at least two stations belonging to the collaborative group, wherein each of the at least two stations transmits on a respective one of the obtained at least two subsets.

According to another aspect of the invention, there is provided a system for transmitting data between a plurality of wireless stations belonging to a collaborative group in a wireless communication network, the system comprising means for reserving a transmission opportunity (TXOP) that includes:

means for receiving at a first station of the plurality of wireless communication stations a request control frame (RTS) for initiating a transmission opportunity (TXOP) reservation for the collaborative group on a first composite channel comprising a plurality of first sub-channels;

means for sending from the first station in response to the request control frame at least one response control frame (CTS) via a second composite channel comprising two or more of the plurality of first sub-channels, the response control frame (CTS) reserving a transmission opportunity (TXOP) for the collaborative group on the second composite channel;

the system further comprising:

means for obtaining at least two non-overlapping subsets; each subset comprising one or more sub-channels belonging to the second composite channel, and means for simultaneously transmitting data within the reserved transmission opportunity (TXOP) from at least two stations belonging to the collaborative group, wherein each of the at least two stations transmits on a respective one of the obtained at least two subsets.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

FIG. 12 is a tabular representation of channel and bandwidth allocation to a collaborative group of communication devices according to four exemplary embodiments of the invention.

DETAILED DESCRIPTION

The invention will now be described by means of specific non-limiting exemplary embodiments and by reference to the figures.

Figure 1:
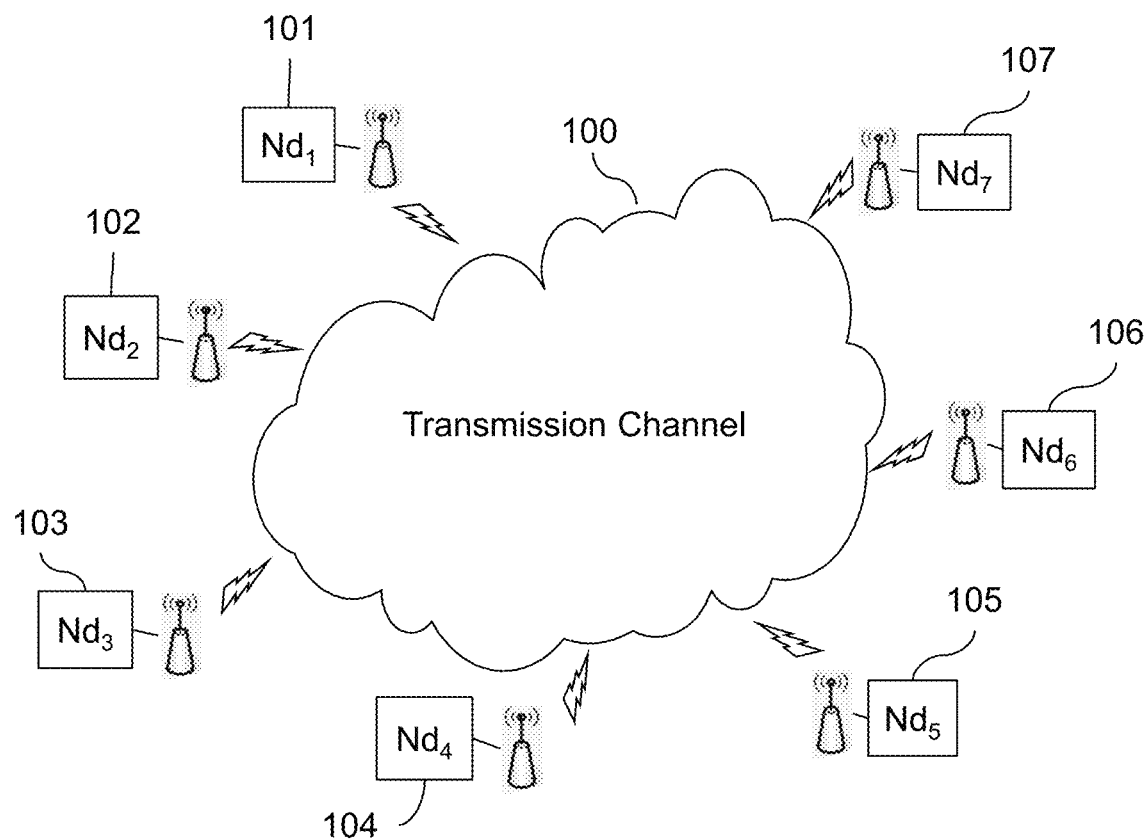
FIG. 1 illustrates a schematic representation of a communications network, in which the present invention can be applied.

FIG. 1 illustrates a communication system in which several communication nodes exchange data frames over a radio transmission channel 100 of a wireless local area network (WLAN).

Access to the shared radio medium to send data frames is based on the CSMA/CA technique, for sensing the carrier and avoiding collision by separating concurrent transmissions in space and time.

Carrier sensing in CSMA/CA is performed by both physical and virtual mechanisms. Virtual carrier sensing is achieved by transmitting control frames to reserve the medium prior to transmission of data frames.

Next, a transmitting node first attempts through the physical mechanism, to sense a medium that has been idle for at least one DIFS (standing for DCF InterFrame Spacing) time period, before transmitting data frames.

However, if it is sensed that the shared radio medium is busy during the DIFS period, the transmitting node continues to wait until the radio medium becomes idle. To do so, it starts a countdown backoff counter designed to expire after a number of timeslots, chosen randomly between [0,CW], CW (integer) being referred to as the Contention Window. This backoff mechanism or procedure is the basis of the collision avoidance mechanism that defers the transmission time for a random interval, thus reducing the probability of collisions on the shared channel. After the backoff time period, the transmitting node may send data or control frames if the medium is idle.

One problem of wireless data communications is that it is not possible for the transmitting node to listen while sending, thus preventing the transmitting node from detecting data corruption due to channel fading or interference or collision phenomena. A transmitting node remains unaware of the corruption of the data frames sent and continues to transmit the frames unnecessarily, thus wasting access time.

The Collision Avoidance mechanism of CSMA/CA thus provides positive acknowledgement (ACK) of the sent data frames by the receiving node if the frames are received with success, to notify the transmitting node that no corruption of the sent data frames occurred.

The ACK is transmitted at the end of reception of the data frame, immediately after a period of time called Short InterFrame Space (SIFS).

If the transmitting node does not receive the ACK within a specified ACK timeout or detects the transmission of a different frame on the channel, it may infer data frame loss. In that case, it generally reschedules the frame transmission according to the above-mentioned backoff procedure. However, this can be seen as a bandwidth waste if only the ACK has been corrupted but the data frames were correctly received by the receiving node.

To improve the Collision Avoidance efficiency of CSMA/CA, a four-way handshaking mechanism is optionally implemented. One implementation is known as the RTS/CTS exchange, defined in the 802.11 standard.

The RTS/CTS exchange consists in exchanging control frames to reserve the radio medium prior to transmitting data frames during a transmission opportunity called TXOP in the 802.11 standard as described below, thus protecting data transmissions from any further collisions.

Figure 2:
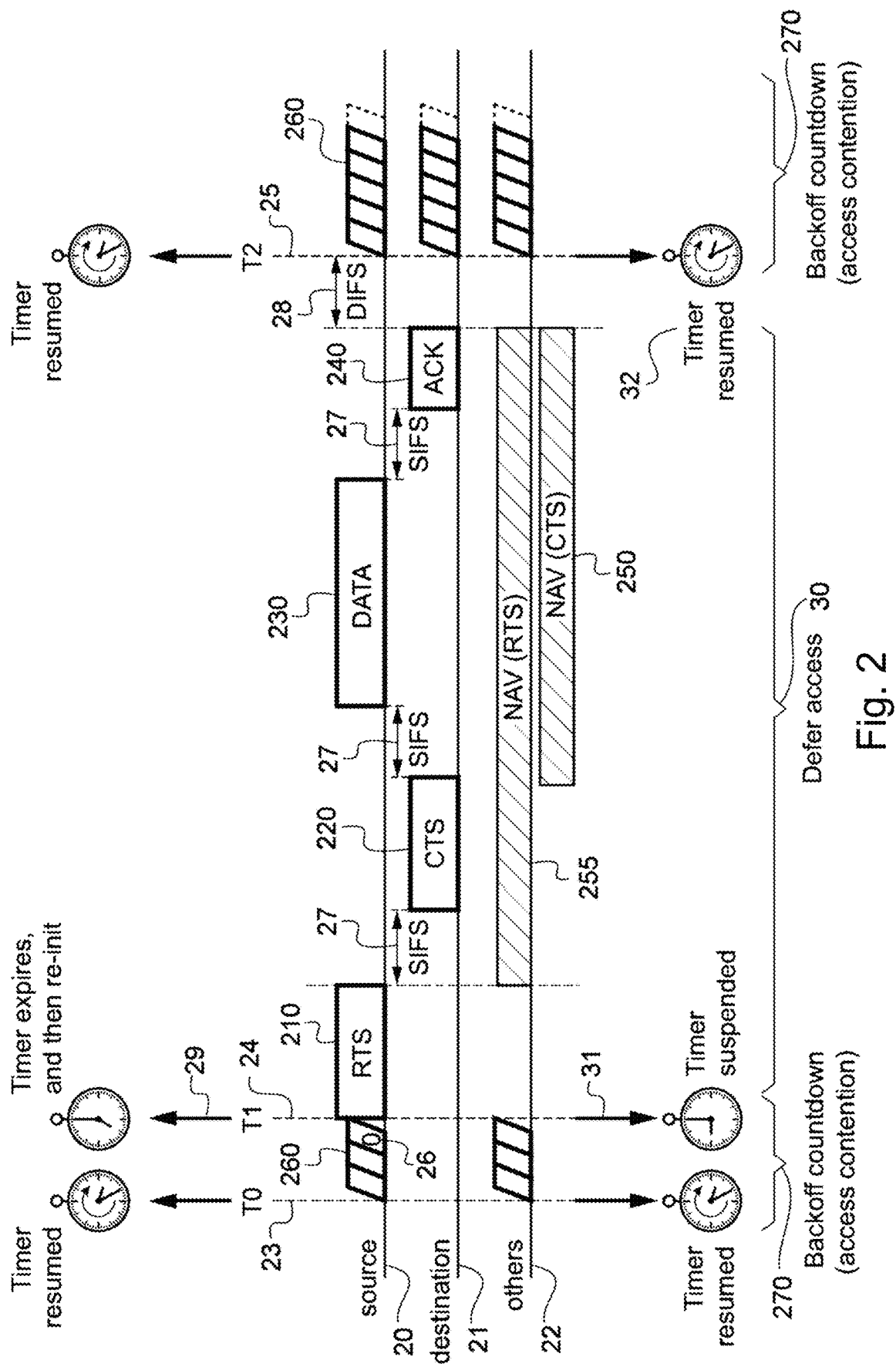
FIG. 2 illustrates the RTS/CTS exchange between an access node and two competing stations according to the prior art technique.

FIG. 2 illustrates the behavior of three groups of nodes during a conventional communication over the 802.11 medium: transmitting or source node 20, receiving or addressee or destination node 21 and other nodes 22 not involved in the current communication.

Upon starting the backoff process 270 prior to transmitting data, a station e.g. transmitting node 20, initializes its backoff time counter to a random value as explained above. The backoff time counter is decremented once every time slot interval 260 for as long as the radio medium is sensed idle (countdown starts from T0, 23 as shown in the Figure).

The time unit in the 802.11 standard is the slot time called 'aSlotTime' parameter. This parameter is specified by the PHY (physical) layer (for example, aSlotTime is equal to 9 µs for the 802.11n standard). All dedicated space durations (e.g. backoff) are multiples of this time unit.

The backoff time counter is 'frozen' or suspended when a transmission is detected on the radio medium channel (countdown is stopped at T1, 24 for other nodes 22 having their backoff time counter decremented).

The countdown of the backoff time counter is resumed or reactivated when the radio medium is sensed idle anew, after a DIFS time period. This is the case for the other nodes at T2, 25 as soon as the transmission opportunity TXOP granted to transmitting node 20 ends and the DIFS period 28 elapses. DIFS 28 (DCF inter-frame space) thus defines the minimum waiting time for a transmitting node before trying to transmit some data. In practice, DIFS=SIFS+2*aSlotTime.

When the backoff time counter reaches zero (26) at T1, the timer expires, the corresponding node 20 will request access onto the medium in order to be granted a TXOP, and the backoff time counter is reinitialized 29 using a new random backoff value.

In the example of the Figure implementing the RTS/CTS scheme, at T1, the transmitting node 20 that wants to transmit data frames 230 sends a special short frame or message acting as a medium access request to reserve the radio medium, instead of the data frames themselves, just after the channel has been sensed idle for a DIFS or after the backoff period as explained above.

The medium access request is known as a Request-To-Send (RTS) message or frame. The RTS frame generally includes the address of the receiving node ("destination 21") and the duration for which the radio medium is to be reserved for transmitting the control frames (RTS/CTS) and the data frames 230.

Upon receiving the RTS frame and if the radio medium is sensed as being idle, the receiving node 21 responds, after a SIFS time period 27 (for example, SIFS is equal to 16 µs for the 802.11n standard), with a medium access response, known as a Clear-To-Send (CTS) frame. The CTS frame indicates the remaining time required for transmitting the data frames, computed from the time point at which the CTS frame starts to be sent.

The CTS frame is considered by the transmitting node 20 as an acknowledgment of its request to reserve the shared radio medium for a given time duration.

Thus, the transmitting node 20 expects to receive a CTS frame 220 from the destination node 21 before sending data 230 using unique and unicast (one source address and one addressee or destination address) frames.

The transmitting node 20 is thus allowed to send the data frames 230 upon correctly receiving the CTS frame 220 and after a new SIFS time period 27.

An ACK frame 240 is sent by the receiving node 21 after having correctly received the data frames sent, after a new SIFS time period 27.

If the transmitting node 20 does not receive the ACK 240 within a specified ACK Timeout (generally within the TXOP), or if it detects the transmission of a different frame on the radio medium, it reschedules the frame transmission according to the backoff procedure.

Since the RTS/CTS four-way handshaking mechanism 210/220 is optional in the 802.11 standard, it is possible for the transmitting node 20 to send data frames 230 immediately upon its backoff time counter reaching zero (i.e. at T1).

The requested time duration for transmission defined in the RTS and CTS frames defines the length of the granted transmission opportunity TXOP, and can be read by any listening node ("other nodes 22" in FIG. 2) in the radio network.

To do so, each node has in memory a data structure known as the network allocation vector or NAV to store the time duration for which it is known that the medium will be busy. When listening to a control frame (RTS 210 or CTS 220) not addressed to itself, a listening node 22 updates its NAVs (NAV 255 associated with RTS and NAV 250 associated with CTS) with the requested transmission time duration specified in the control frame. The listening node 22 thus keeps in memory the time duration for which the radio medium will remain busy.

Access to the radio medium for the other nodes 22 is consequently deferred 30 by suspending 31 their associated timer and then by later resuming 32 the timer when the NAV has expired.

This prevents the listening nodes 22 from transmitting any data or control frames during that period.

It is possible that the destination node 21 does not receive the RTS frame 210 correctly due to a message/frame collision or to fading. Even if it does receive it, the destination node 21 may not always respond with a CTS 220 because, for example, its NAV is set (i.e. another node has already reserved the medium). In any case, the transmitting node 20 enters into a new backoff procedure.

The RTS/CTS four-way handshaking mechanism is very efficient in terms of system performance, in particular with regard to large frames since it reduces the length of the messages involved in the contention process.

In detail, assuming perfect channel sensing by each communication node, collision may only occur when two (or more) frames are transmitted within the same time slot after a DIFS 28 (DCF inter-frame space) or when their own back-off counter has reached zero nearly at the same time T1). If both transmitting nodes use the RTS/CTS mechanism, this collision can only occur for the RTS frames. Fortunately, such collision is early detected by the transmitting nodes since it is quickly determined that no CTS response has been received.

As described above, the original IEEE 802.11 MAC always sends an acknowledgement (ACK) frame 240 after each data frame 230 received.

However, such collisions limit the optimal functioning of the radio network. As described above, simultaneous transmit attempts from a number of wireless stations lead to collisions. The backoff procedure for the family of IEEE 802.11 standards was first introduced for the DCF mode as the basic solution for collision avoidance, and further employed by the IEEE 802.11e to solve the problem of internal collisions between enhanced distributed channel access functions (EDCAFs). In the emerging IEEE 802.11n/ac standards, the backoff procedure is still used as the fundamental approach for supporting distributed access among mobile stations.

The rapid growth of smart mobile devices is driving mobile data usage and 802.11 WLAN proliferation, creating an ever-increasing demand for faster wireless networks to support bandwidth-intensive applications, such as web browsing and video streaming. The new IEEE 802.11ac standard is designed to meet this demand, by providing major performance improvements over previous 802.11 generations.

The IEEE 802.11ac standard is an emerging very high throughput (VHT) wireless local access network (WLAN) standard that can achieve physical layer (PHY) data rates of up to 7 Gbps for the 5 GHz band. The scope of 802.11ac includes single link throughput supporting at least 500 Mbps, multiple-station throughput of at least 1 Gbps, and backward compatibility and coexistence with legacy 802.11 devices in the 5 GHz band. Consequently, this standard is targeted at higher data rate services such as high-definition television, wireless display (high-definition multimedia interface—HDMI—replacement), wireless docking (wireless connection with peripherals), and rapid sync-and-go (quick upload/download).

In general, 802.11ac could be schematized as an extension of IEEE 802.11n in which the two basic notions of multiple-input, multiple-output (MIMO) and wider channel bandwidth are enhanced for greater efficiency.

Using optional MIMO feature, an access point AP (having multiple antennae) may communicate with several stations simultaneously using Spatial Division Multiple Access (SDMA). SDMA multiple access scheme enables multiple streams transmitted to different receivers at the same time to share the same frequency channel. This invention is not devised for such sender device having several antennae.

Contrary to 802.11n where each station should support up to 2 spatial streams (SSs) and 40 MHz transmissions, only one spatial stream is required in 802.11ac but support for 80 MHz channel bandwidth is added. One reason for such a change is that increasing the number of antennas often results in higher cost. Supporting multiple Spatial Streams (SS) implies having at least the same number of antennas (and as much reception chains behind these antennas), thus important costs. Consequently a lot of 802.11n devices available on the market could only support 1 SS. In 802.11ac, support for only 1 SS is required so that devices, and especially smartphones, could be labeled as '802.11ac compliant'. The 80 MHz mode is made mandatory as a lower cost alternative to the 2 SS and 40 MHz configuration. Hence, the modes that utilize more than one spatial stream are now optional in 802.11ac.

Figure 3A:
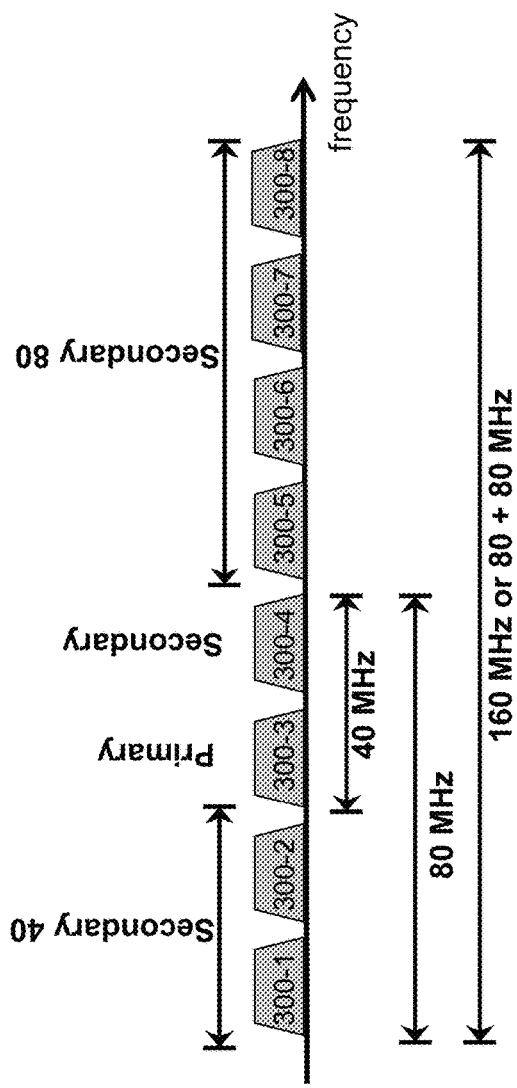
FIG. 3a illustrates 802.11ac channel allocation that support channel bandwidth of 20 MHz, 40 MHz, 80 MHz or 160 MHz as known in the art.

As a result, 802.11ac is targeting larger bandwidth transmission through multi-channel operations. The wider channel aspect will be further described in regards to FIG. 3. A MAC mechanism for dynamically protecting and allocating multiple channels will be presented in regards to FIG. 4.

In order to support wider channel bandwidths (FIG. 3a), IEEE 802.11ac introduces support of 20 MHz, 40 MHz, 80 MHz, and 160 MHz channel bandwidth, compared to only 20 MHz and 40 MHz supported by 802.11n. The 20 MHz component channels 300-1 to 300-8 may be concatenated to form a larger communication channel.

The 160 MHz channel bandwidth is composed of two 80 MHz channels that may or may not be contiguous. The 80 MHz and 40 MHz channels are respectively composed of two adjacent or contiguous 40 MHz and 20 MHz channels, respectively. The support of 40 MHz and 80 MHz channel bandwidth is mandatory while support of 160 MHz and 80+80 MHz is optional (80+80 MHz means that a multi-channel is configured of two non-contiguous channels having a bandwidth of 80 MHz).

Figure 3B:
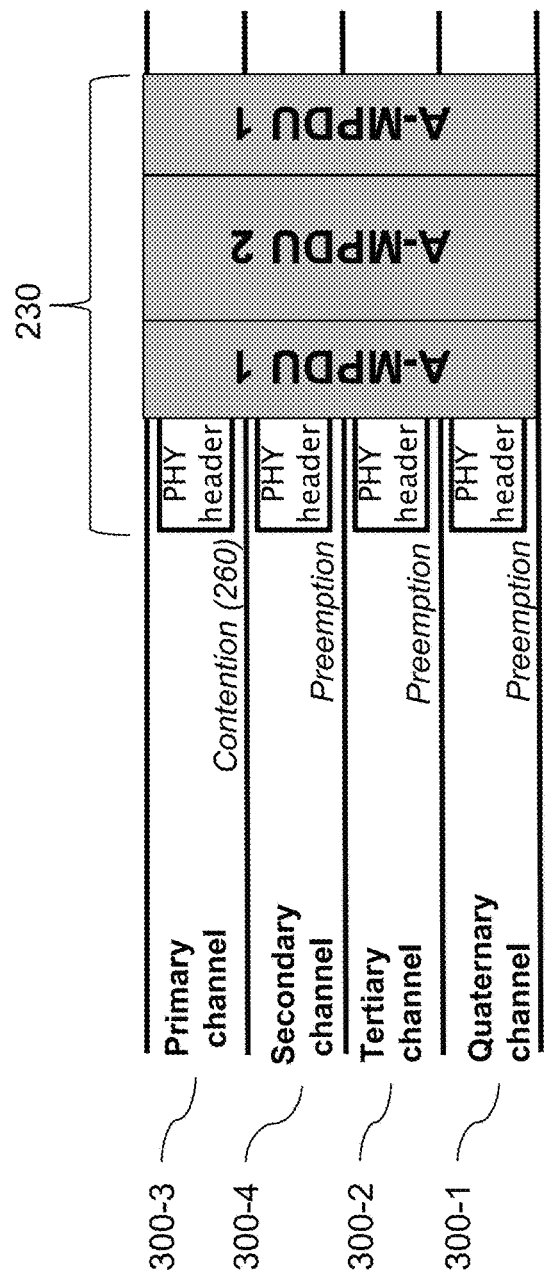
FIG. 3b illustrates an example of 802.11ac multichannel station using a transmission opportunity on a 80 MHz channel as known in the art.

A multichannel station (supporting 80 MHz transmissions in the illustrated example of FIG. 3b) wins a TxOP through the enhanced distributed channel access (EDCA) mechanism on the primary channel (300-3). For each channel bandwidth, 802.11ac designates one channel as "primary," meaning that it is used for transmission at that bandwidth. It shall, however, transmit a 80 MHz PPDU (PPDU means PLOP Protocol Data Unit, with PLOP for Physical Layer Convergence Procedure; basically a PPDU refers to a 802.11 physical frame) only if all other channels have been idle for at least a point coordination function (PCF) inter-frame spacing (PIFS). If at least one of the secondary channels has not been idle for a PIFS, then the station must either restart its backoff count, or use the obtained TxOP for 40 MHz or 20 MHz PPDUs.

The vertical aggregation scheme reflects the extension of the payload 230 to all channels. If there is only one collision in one of the channels at a given time, the risks of having a corrupted segment of these sequences are very high despite the error-correcting decoding process. All MPDU (MAC Protocol Data Unit) frames inside the PPDU could thus automatically be considered as incorrect. Thus in high load WLAN environments, a DATA packet split over multiple channels may encounter more collisions, thus wasting the channel resource.

Further (FIG. 4), owing to its multi-channel capability, 802.11ac supports enhanced protection in which the RTS/CTS handshake mechanism is modified to support static or dynamic bandwidth reservation and carry the channel bandwidth information.

Bandwidth signaling is added to the RTS and CTS frames (20, 40, 80 or 160 MHz values). A station sends a RTS frame with the bandwidth of the intended transmission (replicated on each 20 MHz channels forming the targeted bandwidth), a receiver replies CTS frame on each secondary channel sensed as free.

As example, prior to transmission of a 80 MHz data frame, the STA1 may transmit an RTS frame 410 configured to use the 20 MHz channel bandwidth to each of 20 MHz channels. That is, in association with the 80 MHz channel bandwidth, a total of four RTS frames can be transmitted in the form of a duplicated PPDU.

STA2 may answer each 20 MHz channel in which RTS frames transmitted from the STA1 have been successfully received using a CTS frame configured to use the 20 MHz channel bandwidth. If the STA2 has successfully received RTS frames from the entire 80 MHz bandwidth, a total of four CTS frames can be transmitted to cover the 80 MHz channel bandwidth.

If the STA1 receives all the CTS frames related to the 80 MHz channel (i.e., if the STA1 receives a total of four CTS frames), a DATA 430-1 frame can be transmitted using the 80 MHz channel bandwidth.

It is expected that every nearby device (legacy or 802.11ac) can receive an RTS on its primary channel. Each of these devices then sets its NAV. Before a client replies with a CTS, it checks if any of the channels in the 80 MHz band is busy. The client STA only replies with a CTS on those channels that are idle, and reports the total bandwidth of the replicated CTS. As with the RTS, the CTS is sent in an 802.11a PPDU format and is replicated across the different 20 MHz channels that are idle.

Figure 4:
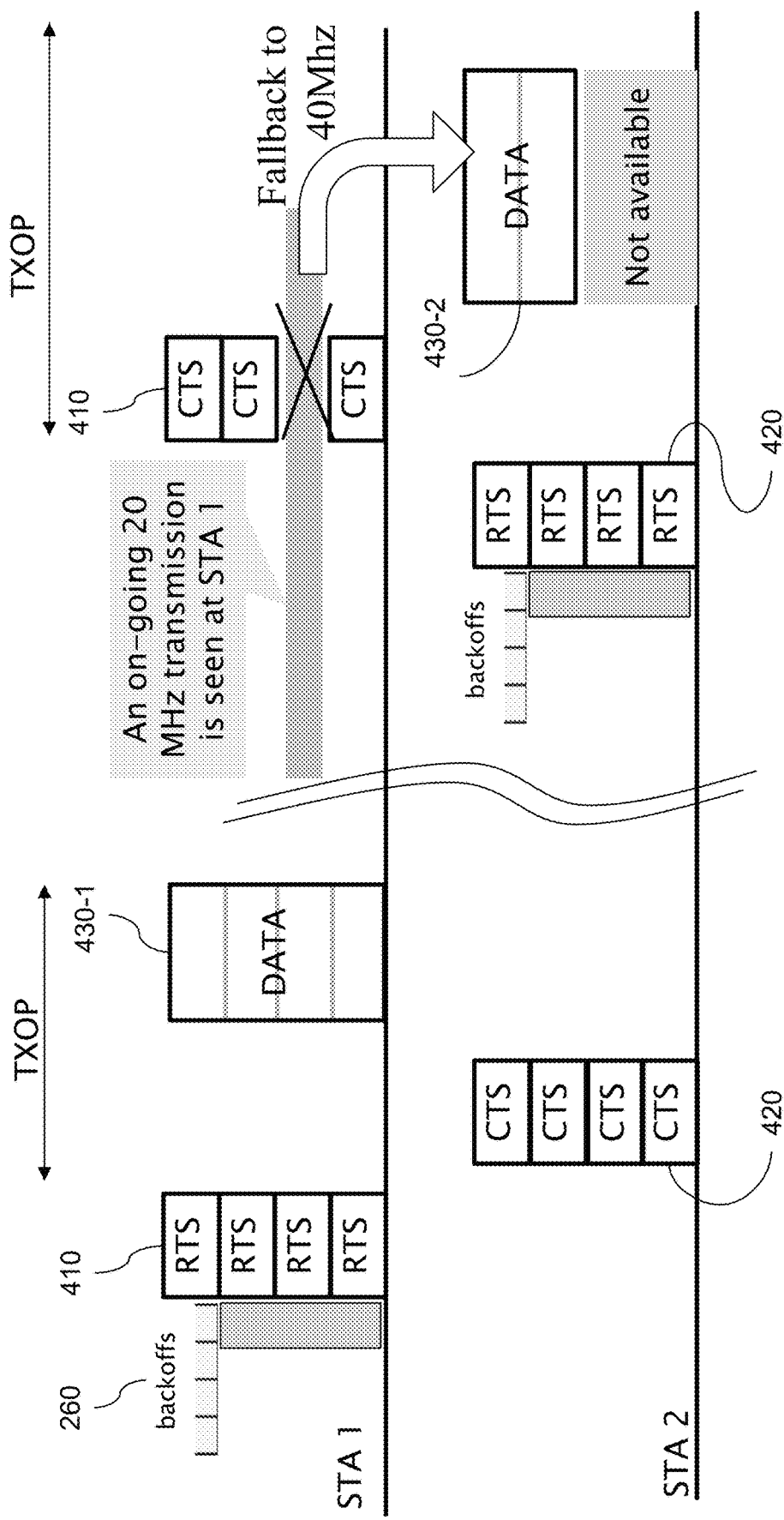
FIG. 4 shows a conceptual diagram illustrating a broadband channel access mechanism employing a 80 MHz channel bandwidth as known in the art.

On the right side of the FIG. 4, a nearby station of STA1 is already transmitting before STA2 starts (only interfering with STA1). Therefore STA1 has to inform STA2 by replying CTS only on the idle channels (three CTS are transmitted). Thus a DATA 430-2 frame can be transmitted using only 40 MHz channel bandwidth.

As addressed earlier, the IEEE 802.11ac standard enables the bonding of up to four, or even eight, 20 MHz channels. Because of the limited number of channels (19 in the 5 GHz band in Europe), channel saturation becomes problematic. Indeed, in densely populated areas the 5 GHz band will surely tend to saturate even with a 20 or 40 MHz bandwidth usage per Wireless-LAN cell.

As a result, the fallback mechanism envisaged by the standard is too limitative.

A channel interference is typically performed by a legacy 802.11a or 802.11n station (transmitting on a 20 MHz channel), so that the 802.11ac station may transmit over a fraction of the original requested bandwidth: depending of which 20 MHz channel (300) is busy, the channel width of resulting composite channel is reduced from 80 MHz to 40 (cases 510 and 511), or 20 MHz (case 520) . . . whereas a 60 MHz bandwidth is potentially available.

One can note the 802.11ac standard has not envisaged using such lost bandwidth, as the RTS/CTS control frames embed a bandwidth indication only supporting a 20, 40, 80 or 160 MHz.

This bandwidth allocation deficiency can be especially problematic with personal devices where the organization has little control over the devices being used. This is ascertained in distributed environments, which are by essence not managed at all. This approach fails in enhancement of the 802.11ac standard.

The invention provides communication methods and devices for data communication over an ad-hoc wireless network, the physical medium of which being shared between a plurality of communication stations (also referred to as nodes or devices). An exemplary ad-hoc wireless network is an IEEE 802.11ac network (and upper versions). But the invention applies to any wireless network where a source node 101-107 sends data of a data stream to a receiving node 101-107 using multiple channels (see FIG. 1). The invention is especially suitable for wireless stations having only 1 Spatial Stream and labeled as '802.11ac compliant'.

The behavior of communication nodes during a conventional communication over an 802.11 medium has been recalled above with reference to FIGS. 1 to 4.

One aspect of the present invention envisages forming a group of peer stations exchanging highly interactive data like live video streams. Those peer nodes are also called collaborative nodes, in the sense they will collaborate or cooperate in order to provide an efficient channel allocation according the method of the invention for their group communication. It is envisaged that there will also exist stations outside of the collaborative group, which may be referred to as legacy 802.11 stations.

A legacy environment typically describes a situation where the stations are independent and do not interact or cooperate with each other for the purpose of allocation of channels or within a composite channel or sub-channels.

A peer node may request access to the shared 802.11 type medium according to the 802.11 legacy protocol, and upon grant of access, several peer nodes may communicate with one or more peer nodes according to a collaborative protocol during the reserved talk time. Thus, if the back-off count reduces to zero on the primary channel for one peer node among the group, said node reserves a medium access (through classical multiple RTS/CTS scheme of 802.11ac) for the group onto a composite channel, and lets the group communicates over the composite channel during this granted 802.11 timeslot. It will become apparent that the composite channel according the present invention is formed of more free channels 300 than the 802.11ac prior-art.

Figure 6:
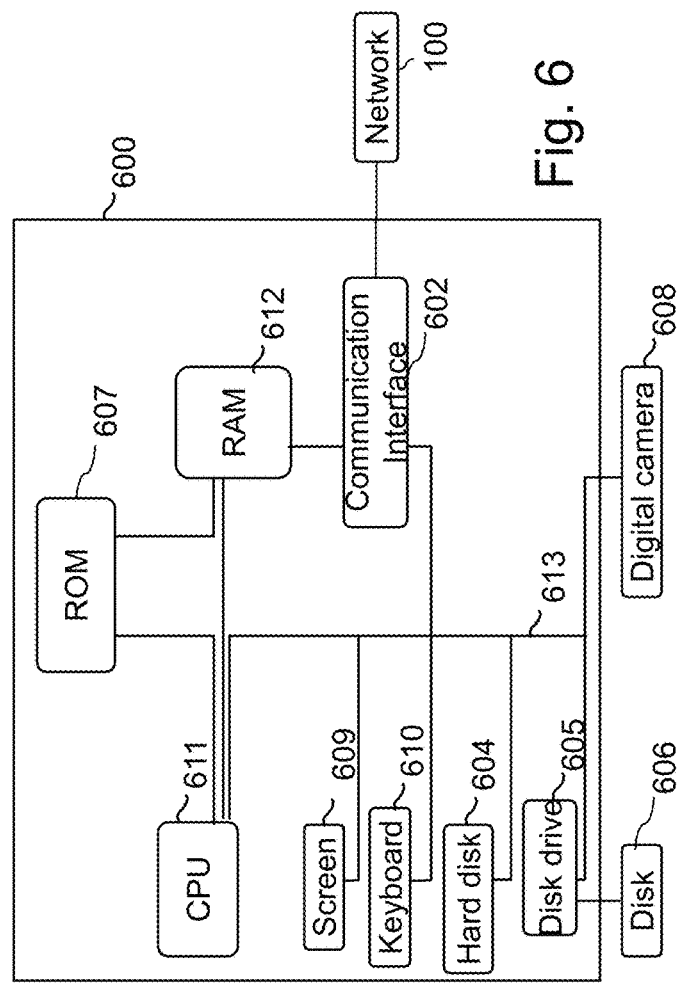
FIG. 6 shows a schematic representation a communication device or station in accordance with an embodiment of the present invention.

FIG. 6 schematically illustrates a communication device 600 of the radio network 100, configured to implement at least one embodiment of the present invention. The communication device 600 may preferably be a device such as a micro-computer, a workstation or a light portable device. The communication device 600 comprises a communication bus 613 to which there are preferably connected:

- a central processing unit 611, such as a microprocessor, denoted CPU;
- a read only memory 607, denoted ROM, for storing computer programs for implementing the invention;
- a random access memory 612, denoted RAM, for storing the executable code of methods according to embodiments of the invention as well as the registers adapted to record variables and parameters necessary for implementing methods according to embodiments of the invention; and
- at least one communication interface 602 connected to the radio communication network 100 over which digital data packets or frames are transmitted, for example a wireless communication network according to the 802.11n protocol. The data frames and aggregated frames are written from a FIFO sending memory in RAM 612 to the network interface for transmission or are read from the network interface for reception and writing into a FIFO receiving memory in RAM 612 under the control of a software application running in the CPU 611.

Optionally, the communication device 600 may also include the following components:

- a data storage means 604 such as a hard disk, for storing computer programs for implementing methods according to one or more embodiments of the invention;

a disk drive 605 for a disk 606, the disk drive being adapted to read data from the disk 606 or to write data onto said disk;

a screen 609 for displaying decoded data and/or serving as a graphical interface with the user, by means of a keyboard 610 or any other pointing means.

The communication device 600 may be optionally connected to various peripherals, such as for example a digital camera 608, each being connected to an input/output card (not shown) so as to supply data to the communication device 600.

Preferably the communication bus provides communication and interoperability between the various elements included in the communication device 600 or connected to it. The representation of the bus is not limiting and in particular the central processing unit is operable to communicate instructions to any element of the communication device 600 directly or by means of another element of the communication device 600.

The disk 606 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may optionally be stored either in read only memory 607, on the hard disk 604 or on a removable digital medium such as for example a disk 606 as described previously. According to an optional variant, the executable code of the programs can be received by means of the communication network 603, via the interface 602, in order to be stored in one of the storage means of the communication device 600, such as the hard disk 604, before being executed.

The central processing unit 611 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 604 or in the read only memory 607, are transferred into the random access memory 612, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

Figure 7:
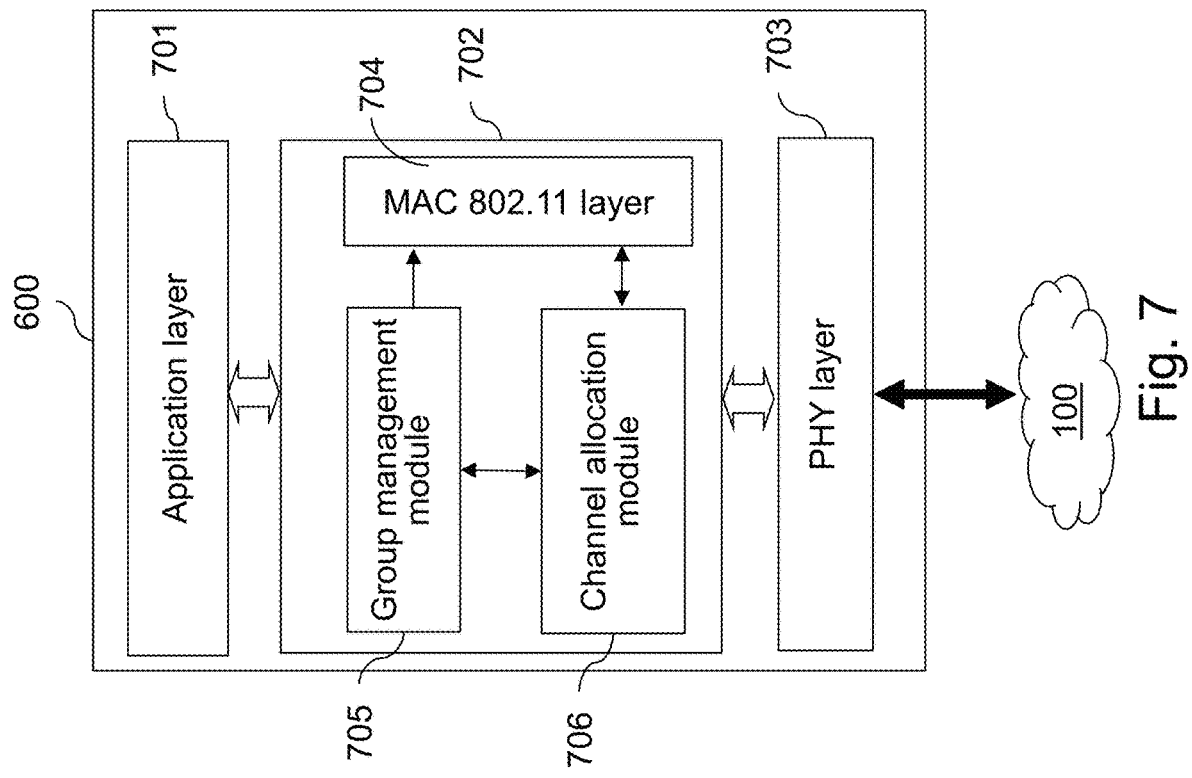
FIG. 7 shows a schematic representation of a wireless communication device in accordance with an embodiment of the present invention.

FIG. 7 is a block diagram schematically illustrating the architecture of a communication device also called node 600 adapted to carry out, at least partially, the invention. As illustrated, node 600 comprises a physical (PHY) layer block 703, a MAC layer block 702, and an application layer block 701.

The PHY layer block 703 (here a 802.11 standardized PHY layer) has the task of formatting and sending or receiving frames over the radio medium used 100, such as a medium access request of the RTS type to reserve a transmission slot, a medium access response of the CTS type to acknowledge reservation of a transmission slot, as well as of MAC data frames and aggregated frames to/from that radio medium.

The MAC layer block or controller 702 preferably comprises a standard MAC 802.11 layer 704 and two additional blocks 705 to 706 for carrying out, at least partially, the invention. The MAC layer block 702 may optionally be implemented in software, which software is loaded into RAM 612 and executed by CPU 611.

Preferably the Group management module 705 implements the management of devices and associated streams related to the collaborative community: typically, an identifier is maintained for a configuration set of registered devices and streams.

Preferably, the Channel allocation module 706 mainly implements the algorithm of the invention, related to catching all free channels during the enhanced dynamic channel allocation procedure. In combination with Group management module 705, it supports a dynamic determination of a data stream allocation upon each granted composite channel for the community of stations of the invention.

Preferably, the application layer block 701 implements an application that generates and receives data packets, for example data packets of a video stream. This application layer block 701 represents all the stack layers above MAC layer according ISO standardization.

Figure 8:
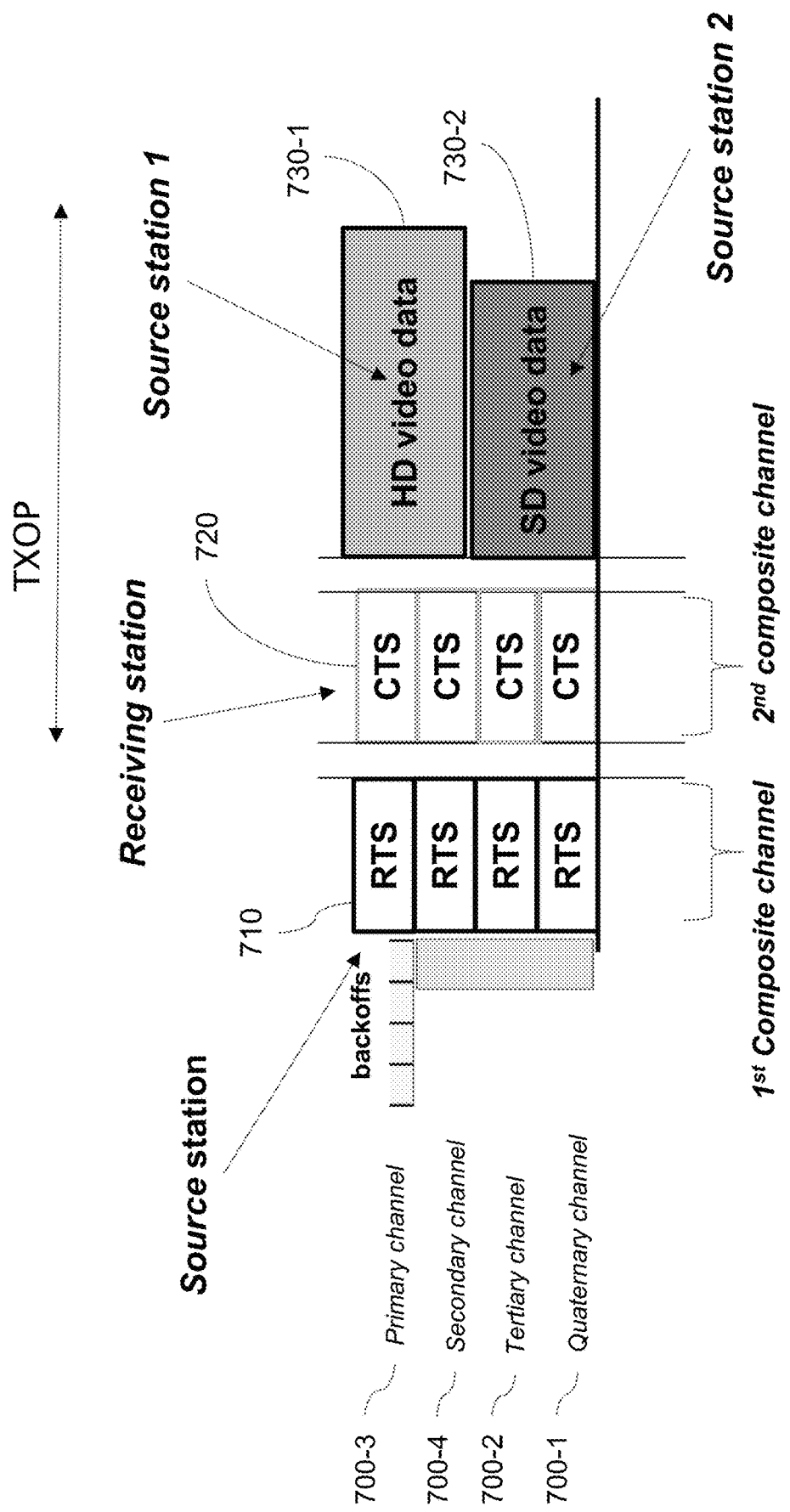
FIGS. 8, 10 and 11 illustrate exemplary communication timelines illustrating embodiments of the invention.

According to an aspect of the invention as illustrated in FIG. 8, there is provided a medium transmission method for a set of collaborative devices, in accordance with an embodiment of the present invention. Preferably, there is provided a transmission method for multiple stations sharing the granted frequency channel amongst each other, wherein a first set of stations communicate over a first set of contiguous channels, and at least one second set of stations communicate over a second set of contiguous channels (the first and second sets forming a composite channel granted to one stations of the invention).

A 802.11ac compliant station having one antenna cannot use non-contiguous channels, therefore such a collaboration within a group of stations ensures that at least one second stations may talk independently in the "not reachable" band.

Although a WLAN system using a multi-channel including four contiguous sub-channels having a channel bandwidth of 20 MHz is assumed in exemplary embodiments, it is only an example. The number of sub-channels or the channel bandwidth thereof is not limited.

In a preferred embodiment, stations of the invention use the standard RTS/CTS handshake over the multiple channels according 802.11ac. A station (source station) of the invention belonging to the collaborative group sends an RTS frame with the bandwidth of the intended transmission (replicated on each 20 MHz channels forming the targeted bandwidth), a receiver replies CTS frame on each secondary channel sensed as free. If the receiving station has successfully received RTS frames from the entire 80 MHz bandwidth, a total of four CTS frames can be transmitted to cover the 80 MHz channel bandwidth. Therefore, according 802.11ac standard, the sender station is allowed to use the whole 80 MHz bandwidth channel for sending its data to the receiver.

According to the present invention, a source station has reserved a TXOP period, which is further sub-leased to several streams of at least one other source station. As a result, several source stations occupy the granted cumulative multi-channel band, in such a way each source station occupies a contiguous bandwidth. According to the illustration in FIG. 8, source stations 1 and 2 talk within a 40 MHz band (respectively 730-1 and 730-2).

In a preferred embodiment, the source device may estimate the TXOP duration prior it sends the RTS frames and tries to reserve the multi-channel for that duration: thus, the source station is preferably talking in the composite channel formed with the primary 20 MHz sub-channel. That is, for the FIG. 8, the source station 1 is the source station having sent the RTS frames.

The legacy 802.11ac standard has envisaged computing, by a transmitting station, the TXOP duration on the basis of the available total bandwidth seen at the transmitting station (before sending the RTS frames). An embodiment of the current invention modifies this by calculating the TXOP duration for the set of available channels dedicated to the source station. Thus, in regards to the exemplary FIG. 8, the TXOP duration indicated in the RTS frames is computed based on amount of data 730-1 to be conveyed on the two sub-channels 700-3 and 700-4.

In an embodiment, a legacy station that conforms to 802.11ac/n, when receiving the RTS frames, will determine the TXOP duration (included in a duration field in the MAC header of RTS frame) and will wait until the end of this period before performing clear channel assessment (CCA). A legacy station that conforms to 802.11ac or either 802.11n, when receiving one RTS frame of a given sub-channel, will compute a TXOP duration (e.g. using rate and length indicated in the PHY header of RTS frame), and will also wait until the end of this period before performing clear channel assessment (CCA).

Thus the wireless medium is protected against access by legacy stations for at least the duration of data 730-1 transmission.

In a preferred embodiment, the duration of data packet on secondary sub-channels should comply with the occupation duration on the primary 20 MHz channel 700-3. This means, in the illustration, that duration of data 730-2 should be shorter or equal than duration of data 730-1.

Consequently, even if the typical RTS/CTS exchange of the prior-art is performed between a single transmitting device and a single receiving device, the invention has enhanced its application to multi-transmitting devices.

Figure 9:
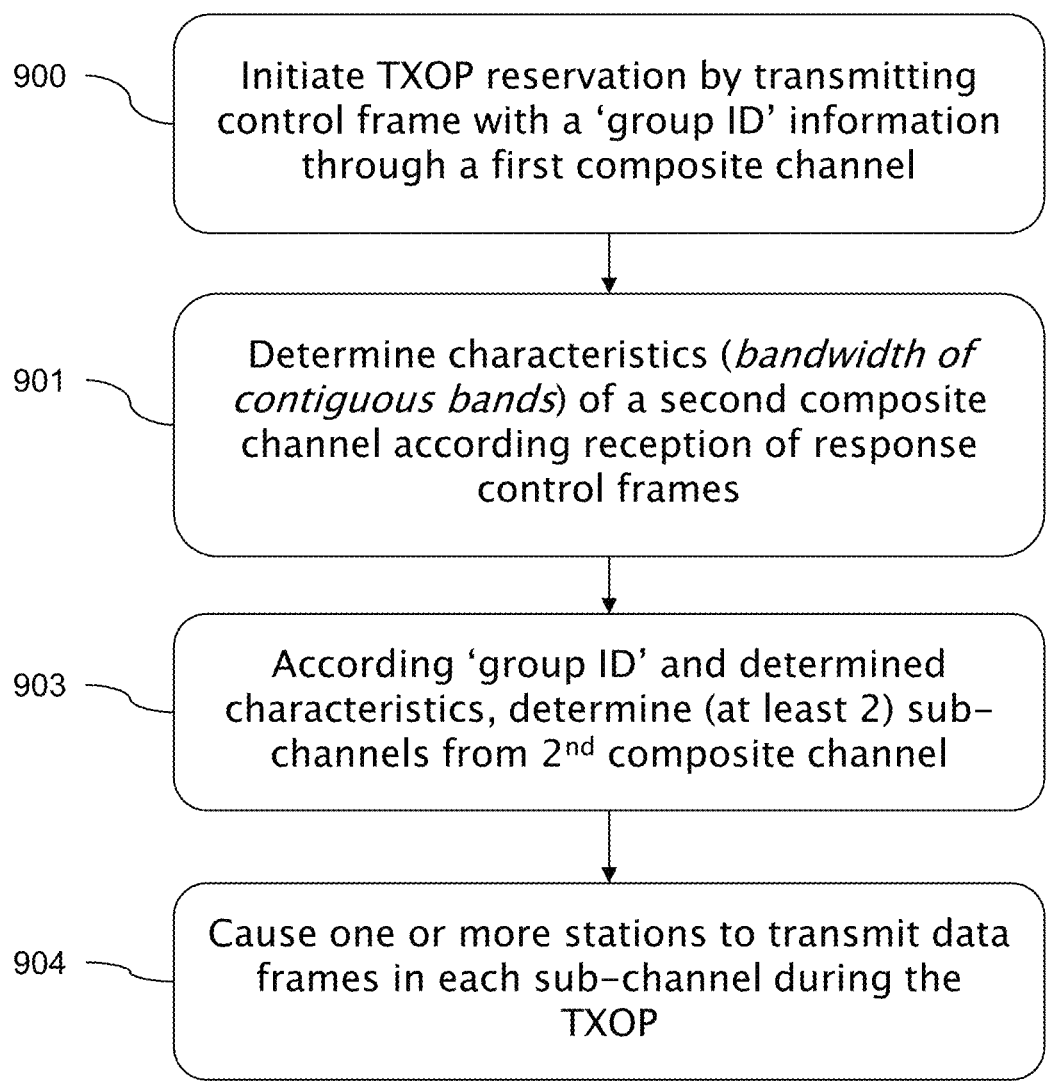
FIG. 9 represents an algorithm of enhanced channel allocation for multi-channel transmission to an 802.11ac wireless medium in accordance with an embodiment of the present invention.

One embodiment of the present invention is represented by the algorithm for enhanced channel allocation for multi-channel transmission in an 802.11ac wireless medium as described in FIG. 9.

The method is preferably implemented by each peer node of the collaborative group.

At step 900, a control frame (RTS frame) to indicate a request to transmit is transmitted over a first composite channel by one station of the group. This frame is preferably replicated over each 20 MHz sub-channel (300-*i*) forming the composite channel. According the 802.11ac standard, the RTS frame includes a bandwidth information to indicate the bandwidth of the data frame 700 (field 1200 called 'BW' of VHT-SIG-A1 portion of 802.11ac PLCP preamble according 802.11ac protocol, see FIGS. 13 & 14).

Based on techniques such as described in 802.11ac standard i.e., energy detection, preamble detection and/or plural channel decoders, a transmitting station is able to determine which of the communication channels are idle for sending the RTS, and is able to apply a fallback mechanism if one of the component sub-channel is detected as busy. According a preferred embodiment of current invention, the RTS transmitting station doesn't apply the fallback scheme but emits the duplicated RTS in each idle sub-channel (the bandwidth indication 1200 keeping the value of whole targeted bandwidth).

According to one embodiment of the invention, the duplicated RTS frame may also include information and instructions to direct the manner by which the transmitter stations are to provide data frames inside the granted TXOP.

According to another embodiment of the invention, any receiving peer station of the collaborative group is able to determine if the TXOP may be shared among stations of the group. This is preferably done by following means:

Analysis of source address: receiving stations forming the peer group may check the MAC source address of RTS frame in order to verify that the sender station pertains to the group, thus knowing if the current medium access is a collaborative access. Optionally, analysis of the partial ID field (1202), wherein a partial ID is computed for the group so that peer receiving stations can quickly determine if received frame is for the group.

Analysis of Group ID (1201): according the field length, up to 62 different possible groupings may be defined. In a preferred embodiment, if the channel allocation is occurring in a managed environment (having an AP), a value may be selected by (and for) the collaborative group outside any managed value by the AP. As further discussed in regards with FIG. 12, group ID values may be used in the context of the invention to determine a configuration of spectral allocation for data frames 730. Thus, according to an embodiment of the invention, the Group ID now defines configuration of both the transmitters and the multiple channel allocation in a multi-channel transmission environment.

According to an embodiment of the invention, any receiving station of the invention may determine the second composite channel composed of idle sub-channels from its standpoint. Preferably, the destination station of the RTS frame is in charge of replying CTS frames, which means it replicates a CTS frame over the free channels forming the second composite channel. The original bandwidth indication of RTS frame is kept inside the CTS header, thus guarantying the maximum bandwidth usage.

At block 901, by detecting CTS frame, all peer stations of the group know the bandwidth of second composite channel. Preferably the bandwidth determination is based on which channels the CTS are received, and not by the bandwidth indication which is now useless. In contrast with legacy 802.11ac stations, the peer stations concerned by group ID identification, may consider isolated channel bands for forming the second composite channel.

At block 903, each identified peer station determines the set of sub-channels of the second composite channel for their transmission. This is performed in regards to table of FIG. 12, wherein a group ID value is linked to a given stream configuration.

Each peer station compares the indication of the number and bandwidth of targeted sub-channels according the table 1100, with the results of the determination of which communication channels are idle from the standpoint of the group (which is different from 802.11ac behavior).

For example, the entry with Group_ID=9 of table 1100 corresponds to the configuration of timeline of FIG. 8. A source station 1 identifies its MAC address (MAC1) inside the first sub-channel, which is 40 MHz wide. Similarly, source station 2 identifies its MAC address (MAC2) inside the second sub-channel, which is also 40 MHz wide.

Thus the invention according to this example provides frequency division, such that some contiguous bands are structured according flow requirements of peer stations.

At block 904 of FIG. 9, one or more stations of the collaborative group transmit in each previously-determined sub-channel of second composite channel.

The communications 730 nevertheless obey to classical requirements such as TXOP boundary as stated before.

Figure 10:
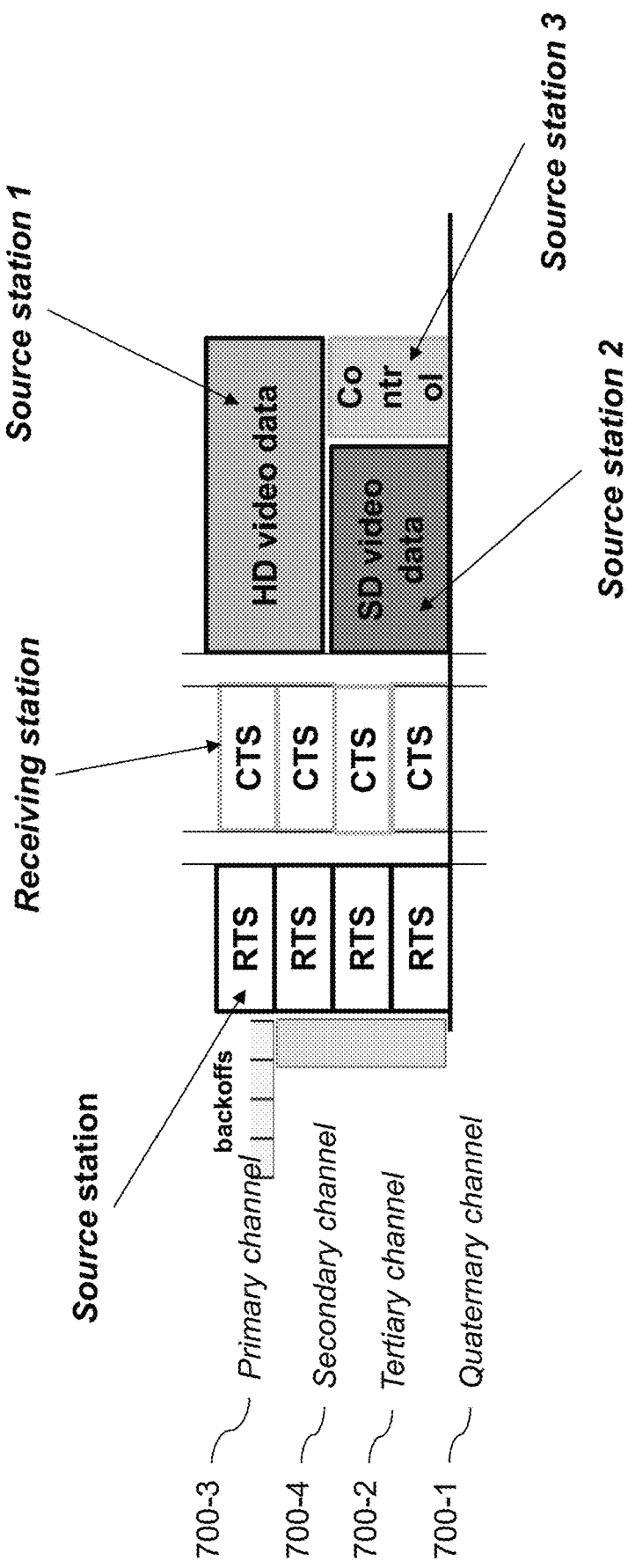

FIG. 10 shows the case of more than one station using the secondary composite channel to transmit in a given TXOP of the first composite channel.

This allows for the sub-lease of the frequency channel in time blocks to two or more transmitting stations of the set of collaborative stations.

Therefore in addition to frequency sub-lease of the bandwidth as illustrated in FIG. 8, this example allows for the further time sub-lease between several stations as illustrated in FIG. 10.

Here another transmitting station (number 3 with MAC3) may also talk in the second sub-channel composed of tertiary and quaternary channels (700-2 and 700-1). This transmission will occur in a Time-Division Multiple Access 'TDMA' fashion, wherein after a first station (e.g. transmitting station 2) finishes using its communication time slot, the time slot is freed and can be used by another station (e.g. transmitting station 3).

This illustration is linked with configuration 'group ID=10' of table 1100, wherein the second composite sub-channel row defines several MAC addresses for the allowed stations. Basically, the order of MAC addresses indicates the ordering of TDMA communication slots.

Figure 11:
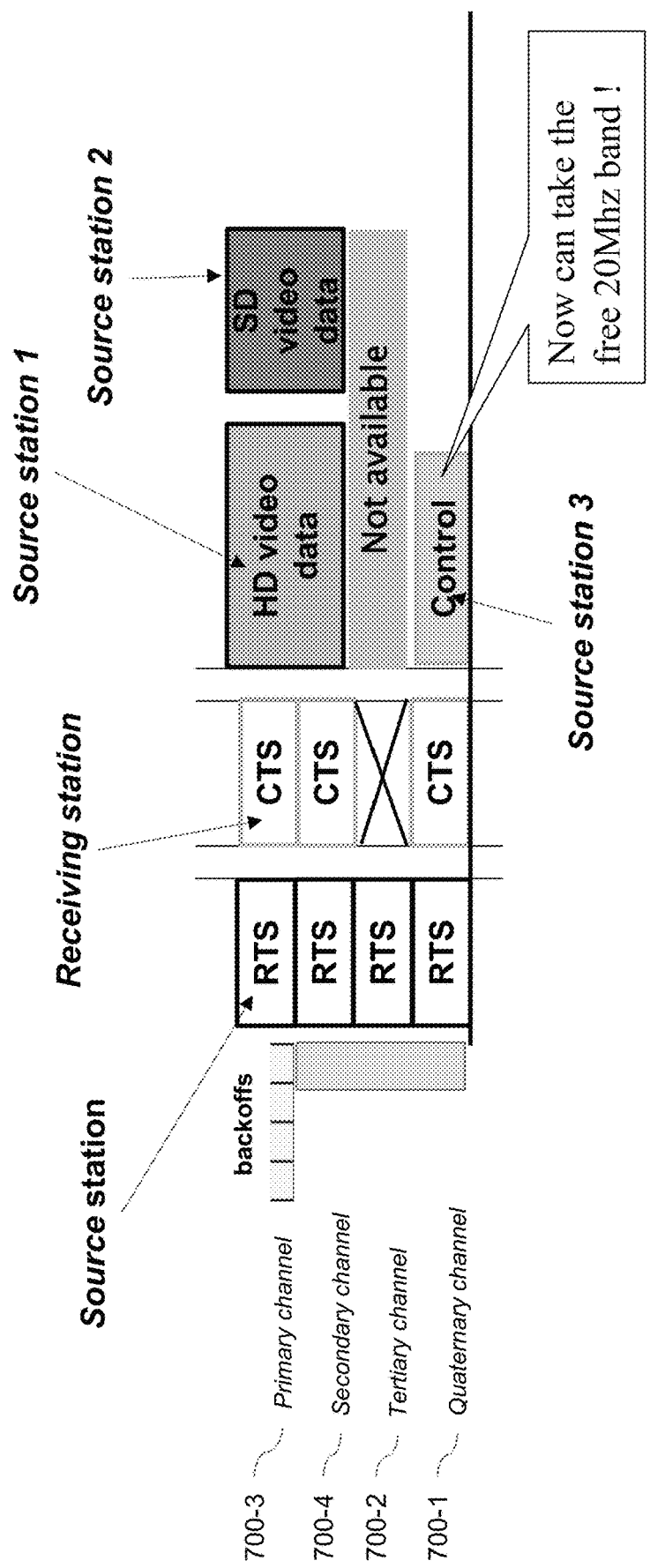

FIG. 11 provides a further example of communication timeline when the RTS/CTS is not capable to reserve the requested total bandwidth. The source station sees the tertiary channel as free, but the receiving station detects the occupation of this channel: the receiving station determines that energy in the tertiary channel was not below a CCA threshold, indicating this sub-channel is busy or reserved by another communication.

Figure 5:
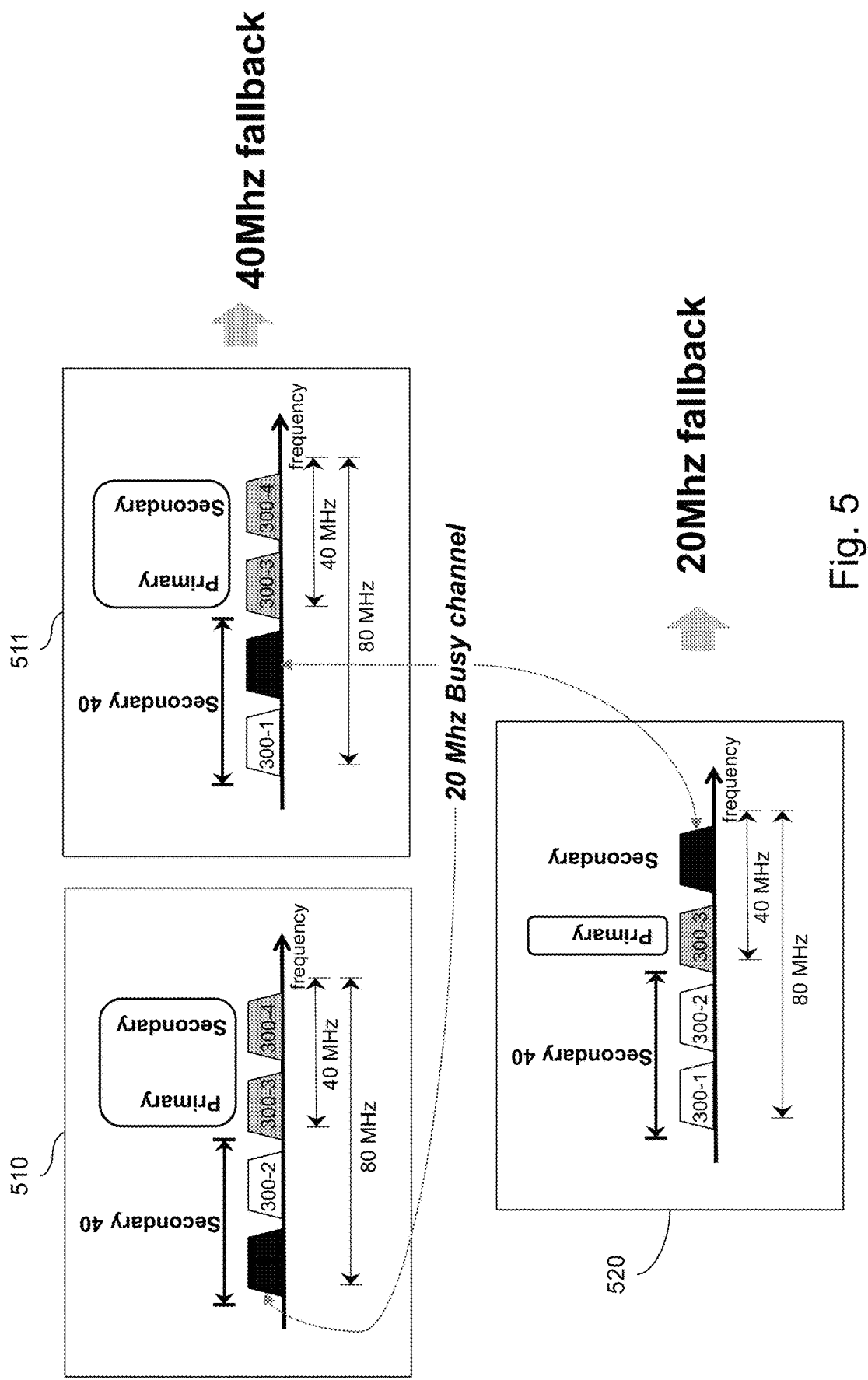
FIG. 5 illustrates three examples of dynamic fallback to narrower channel widths in the presence of co-channel interference or noise that only affects a portion of the larger channel.

This case can be compared to 511 of FIG. 5 wherein the 802.11ac standard states a fallback scheme to 40 MHz transmission.

According to an aspect of the invention, the tertiary channel is still unavailable (no CTS sent), but the quaternary channel will be used by the at least one transmitting stations that are configured to communicate over a composite channel formed of the quaternary channel.

If some transmitting stations are expected to transmit over a 40 MHz channel composed of tertiary and quaternary channels, then these stations will fall back to a 20 MHz transmission over the quaternary channel.

It becomes clear that that in this case a total of 60 MHz transmission scheme for a set of transmitting stations, whereas the legacy 802.11ac would have dropped back to a 40 MHz transmission for a single transmitting station.

In a context of dense channel usage, the chances of finding an idle contiguous channel of 80 MHz bandwidth (according but not limited to the figure) are very limited. This problem can be at least partially solved by using non-contiguous channels to form the desired bandwidth. However, for a hardware point of view, it implies duplicating the front-end segments per station for independent receive frequency filtering and signal forming (front-end segments are composed of intermediate frequency filtering and up/down conversion chains, including digital to analog converter and analog to digital converter (ADC) respectively).

When using non-contiguous channels, there are as many segments as there are separate blocks of channels In the case where the used channels are all contiguous, there is only need for one front-end segment;
On the other hand, if the used channels are non-contiguous, there are at least two front-end segments.

This idea solves this issue for one chain/one antenna device (11ac compliant device) as it permits allocation of a plurality of contiguous sub-channels to several sender stations.

An exemplary illustration of channel allocation within a collaborative group of stations is shown in FIG. 12.

A group ID value (preferably ranging from 0 and 63 values, which are considered by 802.11ac standard as values indicating non-group or single-user communications) is allocated to a given stream configuration inside the collaborative community. Typically, management frames are used to consolidate a channel allocation table in a distributed manner, such as any peer station handles a copy of table 1100 in its module 705.

The bandwidth 1101 is the whole targeted bandwidth for the set of communications 730, and suits with the legacy possibilities of 802.11ac (e.g. 20, 40, 80 or 160 MHz). This choice is advantageous for keeping legacy compliancy for the medium access mechanism.

One aspect of the invention pertains into allocating the granted channel capacity, this is illustrated in column 1102 of FIG. 12, wherein some composite sub-channels are managed by the collaborative group. It should become apparent that the number of (composite) sub-channels 1102 is limited to the number of 20 MHz channels forming the whole bandwidth 1101. For the sake of simplicity, only 2 composite sub-channels are shown in FIG. 12.

Last column lists the stations allowed to communicate inside each composite sub-channel 1102. A list of MAC addresses is provided as a simple example, but any criteria may be used in order to identify the transmitting stations. In addition, it is possible to insert stream identifiers instead of the MAC addresses of transmitting stations, in such a way that the granularity of allowed data 730 is finer. The above description is merely described through exemplary means of identification for allowed data 730 and stations, and is not intended to be exhaustive.

The rows with group ID equal to '11' and '12' both conduct to the illustrated timeline of FIG. 11. This timeline case displays the result of having the tertiary channel occupied for the two configurations.

In the first of the two configurations (group ID=11), the second composite sub-channel 1102 is affected by the tertiary channel busy, so that it is reduced to a 20 MHz bandwidth. As a result, the first composite channel 1102 can still convey the streams of source stations 1 and 2, but the second composite channel is only composed at that time of the quaternary channel 700-1 for transmitting stream of source station 3.

In the second of the two configurations (group ID=12), a first composite channel may be formed of a 60 MHz bandwidth composed of three 20 MHz channels (this possibility is not provided by 802.11ac standard). As tertiary channel 700-2 is busy, the first composite channel will fall back to a 40 MHz wide communication for the current TXOP. The second composite channel is not affected with the busy 20 MHz channel 700-2.

Figure 13:
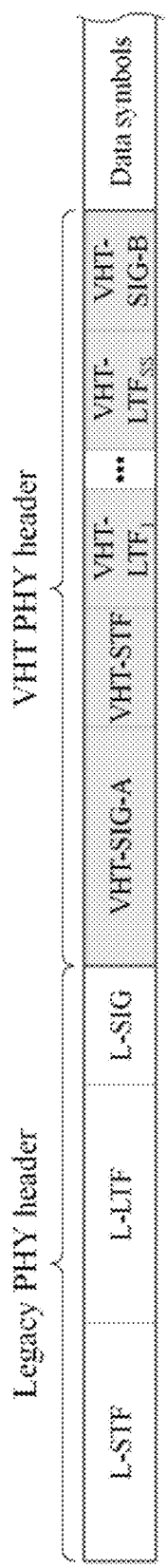
FIGS. 13 and 14 illustrate a typical 802.11ac frame format as known in the art adapted to implement an embodiment of the invention.

The 802.11ac frame format is shown in FIG. 13 and begins as expected with a preamble. The first 3 fields are L-STF (Short Training Field), L-LTF (Long Training Field) and L-SIG (Signal). The L-STF and L-LTF contain information that allows the device to detect the signal, perform frequency offset estimation, timing synchronization, etc. The 'L-' stands for 'legacy' and the details of the sequences used in these fields for the 20 MHz signals are the same as the legacy 11a and 11n preamble fields which allows for all 802.11 devices to synchronize to the signal. In addition, the L-SIG field includes information regarding the length of the rest of the packet. This means that all devices including the legacy devices will know that a packet of a given length is being transmitted.

The next fields in the packet beginning with VHT are new to 11ac. (VHT=11ac and stands for Very High Throughput.) The VHT-SIG-A field contains two OFDM symbols.

The first symbol is modulated using BPSK, so any 11n device listening will think that the packet is an 11a.

Important information is contained in the bits of these two symbols such as bandwidth mode, MCS (Modulation and Coding Scheme) for the single user case, number of space time streams, etc.

The legacy fields and the VHT-SIG-A fields are duplicated over each 20 MHz of the bandwidth.

After the VHT-SIG-A, the VHT-STF is sent. The primary function of the VHT-STF is to improve automatic gain control estimation in a MIMO transmission.

The next 1 to 8 fields of the packet are the VHT-LTFs, one per spatial stream to be used for transmission. LTF fields allow the receiver to calculate the multipath characteristics of the channel and apply them to the MIMO algorithm.

The VHT-SIG-B is the last field in the preamble before the data field is sent. VHT-SIG-B is BPSK modulated and provides information on the length of the useful data in the packet and in the case of MU-MIMO provides the MCS. (The MCS for single user case is transmitted in VHT-SIG-A.)

Following the preamble, the data symbols are transmitted.

Figure 14:
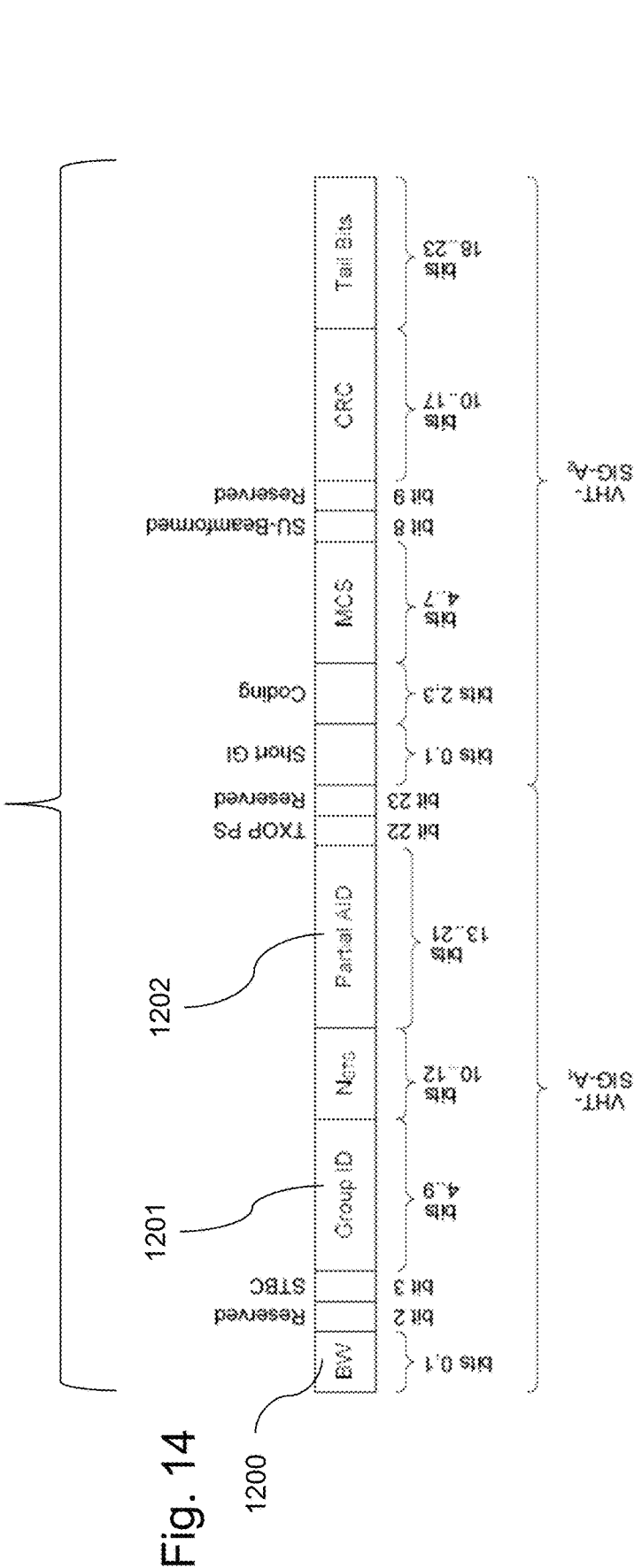

FIG. 14 presents the VHT-SIG-A format for the single user case with the number of bits used for each of the fields.

Bandwidth field: Two bits are used to indicate the channel bandwidth: 0 for 20 MHz, 1 for 40 MHz, 2 for 80 MHz, and 3 for 160 MHz.

For single-user frame transmission, a partial association ID (partial AID) field is an abbreviated indication of the intended recipient of the frame, which thus enables any receiving station to enter power save mode when it ascertains that it is not the intended recipient. For transmissions to an AP, the partial AID is the last nine bits of the BSSID. For a client, the partial AID is an identifier that combines the association ID and the BSSID of its serving AP.

A Group identifier (group ID) field is introduced in the VHT-SIG-A. The downlink MU-MIMO transmissions can be organized in the form of MU-TXOP to facilitate the sharing of TXOP where AP can perform simultaneous transmissions to multiple receiving STAs by using the group ID. Stations can determine whether they are part of the multiple-user transmission or not. Even if targeted to MU-MIMO, the frame format takes it for all frames. This field enables a receiver to determine whether the data payload is single-user or multi-user. When transmitting a multi-user frame, value range is 1-62 and indicates intended MU group (the group definitions are established by AP before transmission of a MU frame and provide information such as a user's position within a group). When transmitting a single-user frame, this field will be 0 or 63. A group ID of 0 is used for frames sent to an AP, and a group ID of 63 is used for frames sent to a client.

According to one preferred embodiment of the invention, the specific usage of the Group identifier (group_ID) field according to the invention is indicated by another information located inside the VHT-SIG-A: For example, the information to use group_ID as specified in current invention is included in any reserved field of VHT-SIG-A header portion (either bit 2, 23 of VHT-SIG-A1; or bit 9 of VHT-SIG-A2). A value of 0 means the 802.11ac classical usage (for downlink MU-MIMO transmissions), whereas a value 1 means configuration of simultaneous transmissions from several stations has to be considered. As a result, with this bit field information, the invention may pick any value of group_ID for identification of channel allocation for single-user type transmission. In addition, this transmission method may be applied by either adhoc stations or access-points (the used field aiming at discriminated between a multiple-user transmission according to 802.11ac or a set of simultaneous single-user transmissions according the invention)

According to another embodiment of the invention, the Group identifier (group ID) field and its specific usage bit are located in the data symbol part of the 802.11 (non-HT) frame format. Typically, these information are signaled in the SERVICE field of the DATA section of non-HT RTS/CTS frames.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

What is claimed is:

1. A method for transmitting data in a wireless communication network, the method comprising:
    sending, from a wireless communication apparatus of a group of wireless communication apparatuses in the wireless communication network, a request-to-send frame for reserving a transmission opportunity for data transmission via a composite channel comprising a plurality of wireless communication channels, the request-to-send frame being duplicated over each wireless communication channel of the composite channel and the request-to-send frame being transmitted after a back off period at the wireless communication apparatus has elapsed;
    receiving, at the wireless communication apparatus, a clear-to-send frame responding to the-request-to send frame; and
    in a case where the clear-to-send frame responding to the request-to-send frame has been received via only a part of the plurality of wireless communication channels, receiving, at the wireless communication apparatus, a data frame from at least two other wireless communication apparatuses of the group wireless communication apparatuses via the part of the plurality of wireless communication channels,
    wherein a first part of the part of the plurality of wireless communication channels is used by a first other wireless communication apparatus of the group of wireless communication apparatuses to transmit a first data frame and a second part of the part of the plurality of wireless communication channels is used by a second other wireless communication apparatus of the group of wireless communication apparatuses to transmit a second data frame, and wherein the transmission of the first data frame by the first other wireless communication apparatus is concurrently performed with the transmission of the second data frame by the second other wireless communication apparatus.

2. The method according to claim 1, wherein the request-to-send frame is a frame defined in the IEEE802.11 series standard.

3. The method according to claim 1, wherein the-clear-to send frame is a frame defined in the IEEE802.11 series standard.

4. The method according to claim 1, wherein another part of the plurality of wireless communication channels is not used concurrently with the transmission of the first data frame by the first other wireless communication apparatus and the transmission of the second data frame by the second other wireless communication apparatus.

5. The method according to claim 1, wherein each of the plurality of wireless communication channels has a 20 MHz bandwidth.

6. A system for transmitting data in a wireless communication network comprising a group of wireless communication apparatuses configured to carry out the steps of:

sending, from a wireless communication apparatus of a group of wireless communication apparatuses in the wireless communication network, a request-to-send frame for reserving a transmission opportunity for data transmission via a composite channel comprising a plurality of wireless communication channels, the request-to-send frame being duplicated over each wireless communication channel of the composite channel and the request-to-send frame being transmitted after a back off period at the wireless communication apparatus has elapsed;

receiving, at the wireless communication apparatus, a clear-to-send frame responding to the-request-to send frame; and in a case where the clear-to-send frame responding to the request-to-send frame has been received via only a part of the plurality of wireless communication channels, receiving, at the wireless communication apparatus, a data frame from at least two other wireless communication apparatuses of the group wireless communication apparatuses via the part of the plurality of wireless communication channels, wherein a first part of the part of the plurality of wireless communication channels is used by a first other wireless communication apparatus of the group of wireless communication apparatuses to transmit a first data frame and a second part of the part of the plurality of wireless communication channels is used by a second other wireless communication apparatus of the group of wireless communication apparatuses to transmit a second data frame, and wherein the transmission of the first data frame by the first other wireless communication apparatus is concurrently performed with the transmission of the second data frame by the second other wireless communication apparatus.

7. A wireless communication apparatus in a wireless communication network comprising a group of wireless communication apparatuses, the wireless communication apparatus comprising at least one microprocessor configured for carrying out the following steps:

sending a request-to-send frame for reserving a transmission opportunity for data transmission via a composite channel comprising a plurality of wireless communication channels, the request-to-send frame being duplicated over each wireless communication channel of the composite channel and the request-to-send frame being transmitted after a back off period at the wireless communication apparatus has elapsed;

receiving a clear-to-send frame responding to the-request-to send frame; and in a case where the clear-to-send frame responding to the request-to-send frame has been received via only a part of the plurality of wireless communication channels, receiving a data frame from at least two other wireless communication apparatuses of the group wireless communication apparatuses via the part of the plurality of wireless communication channels, wherein a first part of the part of the plurality of wireless communication channels is used by a first other wireless communication apparatus of the group of wireless communication apparatuses to transmit a first data frame and a second part of the part of the plurality of wireless communication channels is used by a second other wireless communication apparatus of the group of wireless communication apparatuses to transmit a second data frame, and wherein the transmission of the first data frame by the first other wireless communication apparatus is concurrently performed with the transmission of the second data frame by the second other wireless communication apparatus.

8. The wireless communication apparatus according to claim 7, wherein the request-to-send frame is a frame defined in the IEEE802.11 series standard.

9. The wireless communication apparatus according to claim 7, wherein the-clear-to send frame is a frame defined in the IEEE802.11 series standard.

10. The wireless communication apparatus according to claim 7, wherein a another part the plurality of wireless communication channels is not used concurrently with the transmission of the first data frame by the first other wireless communication apparatus and the transmission of the second data frame by the second other wireless communication apparatus.

11. The wireless communication apparatus according to claim 7, wherein each of the plurality of wireless communication channels has a 20 MHz bandwidth.

12. A method for controlling a wireless communication apparatus in a wireless communication network comprising a group of wireless communication apparatuses, the method comprising:

sending a request-to-send frame for reserving a transmission opportunity for data transmission via a composite channel comprising a plurality of wireless communication channels, the request-to-send frame being duplicated over each wireless communication channel of the composite channel and the request-to-send frame being transmitted after a back off period at the wireless communication apparatus has elapsed;

receiving a clear-to-send frame responding to the-request-to send frame; and in a case where the clear-to-send frame responding to the request-to-send frame has been received via only a part of the plurality of wireless communication channels, receiving a data frame from at least two other wireless communication apparatuses of the group wireless communication apparatuses via the part of the plurality of wireless communication channels, wherein a first part of the part of the plurality of wireless communication channels is used by a first other wireless communication apparatus of the group of wireless communication apparatuses to transmit a first data frame and a second part of the part of the plurality of wireless communication channels is used by a second other wireless communication apparatus of the group of wireless communication apparatuses to transmit a second data frame, and wherein the transmission of the first data frame by the first other wireless communication apparatus is concurrently performed with the transmission of the second data frame by the second other wireless communication apparatus.

13. The method according to claim 12, wherein the request-to-send frame is a frame defined in the IEEE802.11 series standard.

14. The method according to claim 12, wherein the-clear-to send frame is a frame defined in the IEEE802.11 series standard.

15. The method according to claim 12, wherein a another part of the plurality of wireless communication channels is not used concurrently with the transmission of the first data frame by the first other wireless communication apparatus and the transmission of the second data frame by the second other wireless communication apparatus.

16. The method according to claim 12, wherein each of the plurality of wireless communication channels has a 20 MHz bandwidth.

* * * * *